US012677124B2

(12) United States Patent
Wulff

(10) Patent No.: US 12,677,124 B2
(45) Date of Patent: Jul. 7, 2026

(54) EXCHANGE OF RANGING DATA

(71) Applicant: Nordic Semiconductor ASA,
Trondheim (NO)

(72) Inventor: Carsten Wulff, Trondheim (NO)

(73) Assignee: Nordic Semiconductor ASA,
Trondheim (NO)

( * ) Notice: Subject to any disclaimer, the term of this
patent is extended or adjusted under 35
U.S.C. 154(b) by 408 days.

(21) Appl. No.: 18/255,219

(22) PCT Filed: Nov. 30, 2021

(86) PCT No.: PCT/EP2021/083552
§ 371 (c)(1),
(2) Date: May 31, 2023

(87) PCT Pub. No.: WO2022/117557
PCT Pub. Date: Jun. 9, 2022

(65) Prior Publication Data
US 2024/0022887 A1      Jan. 18, 2024

(30) Foreign Application Priority Data

Dec. 1, 2020    (FI) ..................................... 20206227

(51) Int. Cl.
*H04W 4/80*          (2018.01)
*H04W 8/00*          (2009.01)
(52) U.S. Cl.
CPC ............. *H04W 4/80* (2018.02); *H04W 8/005*
(2013.01)
(58) Field of Classification Search
CPC ...................................................... H04W 4/80
See application file for complete search history.

(56) References Cited

U.S. PATENT DOCUMENTS

| | | | | | |
|---|---|---|---|---|---|
| 10,455,442 | B1 * | 10/2019 | Li | ......................... | H04B 7/0802 |
| 2014/0135042 | A1 | 5/2014 | Buchheim et al. | | |
| 2015/0373749 | A1 * | 12/2015 | Palin | ...................... | H04W 76/10 |
| | | | | | 455/41.2 |
| 2016/0241726 | A1 * | 8/2016 | Okamura | .............. | G06F 3/1292 |
| 2017/0026791 | A1 * | 1/2017 | Weizman | .............. | H04W 4/023 |
| 2017/0272906 | A1 * | 9/2017 | Kerai | .................... | H04W 12/06 |

(Continued)

FOREIGN PATENT DOCUMENTS

| | | |
|---|---|---|
| WO | 2013054144 A1 | 4/2013 |
| WO | 2016049223 A1 | 3/2016 |
| WO | 2019188892 A1 | 10/2019 |

OTHER PUBLICATIONS

Anonymous, The Bluetooth Low Energy Link Layer Specifications,
Retrieved from Internet: URL:https://www.bluetooth.com/specifications/
adopted-specifications, Dec. 4, 2014, 102 pages, v 4.2.

(Continued)

*Primary Examiner* — Wen W Huang
(74) *Attorney, Agent, or Firm* — Nixon & Vanderhye PC

(57) ABSTRACT

According to an aspect, there is provided a first radio device
for performing the following. The first radio device causes
wireless transmission of one or more first advertising mes-
sages at one or more advertising radio frequencies using a
connectionless mode of the first radio device. The radio
device receives, for at least one first advertising message, a
first scan request from a second radio device and transmits,
for each first scan request, a first scan response to the second
radio device. Based on one or more received first scan
requests, the first radio device performs bi-directional chan-
nel sounding with the second radio device at one or more
sounding radio frequencies. The first radio device receives,
from the second radio device, at least one first message
comprising information on second channel sounding mea-
surements and transmits, to the second radio device, at least
one second message comprising information on first channel
sounding measurements performed by the first radio device.

13 Claims, 4 Drawing Sheets

(56)          References Cited

U.S. PATENT DOCUMENTS

| | | | |
|---|---|---|---|
| 2017/0346852 A1* | 11/2017 | Chhabra | H04W 64/003 |
| 2018/0295660 A1* | 10/2018 | Choi | H04W 76/14 |
| 2020/0059770 A1* | 2/2020 | Smith | H04B 17/10 |
| 2020/0118372 A1 | 4/2020 | Stitt et al. | |
| 2020/0120509 A1 | 4/2020 | Stitt et al. | |
| 2021/0029528 A1* | 1/2021 | Huang | H04W 76/11 |
| 2022/0066019 A1* | 3/2022 | Waheed | G01S 13/84 |

OTHER PUBLICATIONS

Core Specification Working Group, Bluetooth Core Specification, Retrieved from: https://www.bluetooth.com/specifications/specs/core-specification/, Dec. 31, 2019, pp. 2936-2964, v5.2.

Zand P et al., A high-accuracy phase-based ranging solution with Bluetooth Low Energy (BLE), Retrieved from: https://ieeexplore.ieee.org/abstract/document/8885791, Apr. 2019, 8 pages, IEEE Wireless Communications and Networking Conference (WCNC), Marrakesh, Morocco.

International Search Report for PCT/EP2021/083552 mailed Mar. 16, 2022, 3 pages.

Written Opinion of the ISA for PCT/EP2021/083552 mailed Mar. 16, 2022, 7 pages.

Finland Search Report for FI20206227 dated Jun. 29, 2021, 2 pages.

Apr. 25, 2026 Office Action issued in Chinese Patent Application No. 202180088456.6, pp. 1-9.

* cited by examiner

EXCHANGE OF RANGING DATA

This application is the U.S. national phase of International Application No. PCT/EP2021/083552 filed Nov. 30, 2021 which designated the U.S. and claims priority to FI 20206227 filed Dec. 1, 2020, the entire contents of each of which are hereby incorporated by reference.

TECHNICAL FIELD

Embodiments described herein relate to wireless communications.

TECHNICAL BACKGROUND

Ranging is conventionally used to determine a distance between two devices. The purpose of the ranging may be to perform link adaptation or to trigger some proximity-based functions, applications, or services. One conventional method for performing ranging is based on evaluating phases of the transmitted and received signals. A phase ambiguity related to longer distances may be solved by performing the phase ranging on multiple carrier frequencies (so-called multi-carrier phase ranging).

In multi-carrier phase ranging and round trip time (RTT) estimation of distance based thereon, it is common to use channel sounding to determine the frequency response of the propagation channel. This channel sounding involves measurements carried out by both of the involved devices. The results of the measurements of a given device need to be transferred to the other device as results of both sets of measurements are needed to estimate distance.

BRIEF DESCRIPTION

The invention is defined by the independent claims. Some embodiments are defined in the dependent claims.

According to a first aspect, there is provided a first radio device comprising means for performing:

causing wireless transmission of one or more first advertising messages at one or more advertising radio frequencies using a connectionless mode of the first radio device;

receiving, using the connectionless mode, for at least one of the one or more first advertising messages, a first scan request requesting a transmission of a first scan response from a second radio device, wherein the second radio device is a device which received said at least one of the one or more first advertising message;

transmitting, for each of one or more first scan requests, a first scan response to the second radio device using the connectionless mode;

performing, based on one or more received first scan requests, bi-directional channel sounding with the second radio device at one or more sounding radio frequencies;

receiving, from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

According to an example of the first aspect, the performing of the channel sounding comprises:

causing synchronizing, before performing any channel sounding measurements, the first radio device with the second radio device.

According to an example of the first aspect, the performing of the channel sounding comprises performing for each radio frequency of the one or more sounding radio frequencies:

transmitting, to the second radio device, at least one first sounding signal at a radio frequency of the one or more sounding radio frequencies; and measuring at least one second sounding signal transmitted by the second radio device at said radio frequency of the one or more sounding radio frequencies.

According to an example of the first aspect, the one or more sounding radio frequencies comprise a plurality of sounding radio frequencies, the one or more first channel sounding measurements comprise a plurality of first channel sounding measurement and the one or more second channel sounding measurements comprise a plurality of second channel sounding measurements and the means are further configured to perform:

estimating a distance between the first and second radio devices based on the information on the plurality of first channel sounding measurements and the plurality of second channel sounding measurements, wherein the information on the plurality of first and second channel sounding measurements comprises at least information on phase measurements at the plurality of sounding radio frequencies and the estimating of the distance is performed using a multi-carrier phase ranging method with round trip timing estimation.

According to an example of the first aspect, the means are further configured to perform:

scanning for advertising messages from radio devices within a scanning range of the connectionless mode at one or more advertising radio frequencies;

during the scanning, receiving one or more second advertising messages transmitted by a third radio device;

transmitting, for each of the one or more second advertising message, a second scan request requesting a transmission of a second scan response to the third radio device using the connectionless mode;

receiving, from the third radio device, one or more second scan responses using the connectionless mode;

performing bi-directional channel sounding with the third radio device at one or more sounding radio frequencies based on the one or more second scan responses;

transmitting, to the third radio device, a third message comprising information on one or more fourth channel sounding measurements performed by the first radio device based on sounding signals received from the third radio device at the one or more sounding radio frequencies; and receiving, from the third radio device, a fourth message comprising information on one or more third channel sounding measurements performed by the third radio device at the one or more sounding radio frequencies.

According to an example of the first aspect, the connectionless mode is a Bluetooth Low Energy connectionless mode.

According to a second aspect, there is provided a second radio device comprising means for performing:

scanning for advertising messages from radio devices within a scanning range of a connectionless mode of the second radio device at one or more advertising radio frequencies;

during the scanning, receiving one or more first advertising messages transmitted by a first radio device;

transmitting, for each of the one or more first advertising message, a first scan request requesting a transmission of a first scan response to the first radio device using the connectionless mode;

receiving, from the first radio device, one or more first scan responses using the connectionless mode;

performing bi-directional channel sounding with the first radio device at the one or more sounding radio frequencies based on the one or more first scan responses;

transmitting, to the first radio device, at least one first message comprising information on one or more second channel sounding measurements performed by the second radio device at the one or more sounding radio frequencies; and receiving, from the second radio device, at least one second message comprising information on one or more first channel sounding measurements performed by the first radio device at the one or more sounding radio frequencies.

According to an example of the second aspect, the performing of the channel sounding comprises:

causing synchronizing, before performing any channel sounding measurements, the second radio device with the first radio device.

According to an example of the second aspect, the performing of the channel sounding comprises performing for each radio frequency of the one or more sounding radio frequencies in sequence:

measuring at least one first sounding signal transmitted by the first radio device at a radio frequency of the one or more sounding radio frequencies; and transmitting, to the first radio device, at least one first sounding signal at said radio frequency.

According to an example of the second aspect, the one or more sounding radio frequencies comprise a plurality of sounding radio frequencies, the one or more first channel sounding measurements comprise a plurality of first channel sounding measurement and the one or more second channel sounding measurements comprise a plurality of second channel sounding measurements and the means are further configured to perform:

estimating a distance between the first and second radio devices based on estimated round trip times based on the information on the plurality of first and second channel sounding measurements, wherein the information on the plurality of first and second channel sounding measurements comprises at least information on phase measurements at the plurality of sounding radio frequencies and the estimating of the distance is performed using a multi-carrier phase ranging method with round trip timing estimation.

According to an example of the second aspect, the connectionless mode is a Bluetooth Low Energy connectionless mode.

According to a third aspect, there is provided a method comprising:

causing wireless transmission of one or more first advertising messages at one or more advertising radio frequencies using a connectionless mode of a first radio device;

receiving, using the connectionless mode, for at least one of the one or more first advertising messages, a first scan request requesting a transmission of a first scan response from a second radio device, wherein the second radio device is a device which received said at least one of the one or more first advertising message transmitting, for each of one or more first scan requests, a first scan response to the second radio device using the connectionless mode;

performing, based on one or more received first scan requests, bi-directional channel sounding with the second radio device at one or more sounding radio frequencies;

receiving. from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

According to a third aspect, there is provided a method comprising:

scanning for advertising messages from radio devices within a scanning range of a connectionless mode of the second radio device at one or more advertising radio frequencies;

during the scanning, receiving one or more first advertising messages transmitted by a first radio device;

transmitting, for each of the one or more first advertising message, a first scan request requesting a transmission of a first scan response to the first radio device using the connectionless mode;

receiving, from the first radio device, one or more first scan responses using the connectionless mode;

performing bi-directional channel sounding with the first radio device at one or more sounding radio frequencies based on the one or more first scan responses;

transmitting, to the first radio device, at least one first message comprising information on one or more second channel sounding measurements performed by the second radio device at the one or more sounding radio frequencies; and receiving, from the second radio device, at least one second message comprising information on one or more first channel sounding measurements performed by the first radio device at the one or more sounding radio frequencies.

According to a third aspect, there is provided a computer program comprising instructions stored thereon for causing an apparatus to perform at least the following:

causing wireless transmission of one or more first advertising messages at one or more advertising radio frequencies using a connectionless mode of a first radio device;

receiving, using the connectionless mode, for at least one of the one or more first advertising messages, a first scan request requesting a transmission of a first scan response from a second radio device, wherein the second radio device is a device which received said at least one of the one or more first advertising message;

transmitting, for each of one or more first scan requests, a first scan response to the second radio device using the connectionless mode;

performing, based on one or more received first scan requests, bi-directional channel sounding with the second radio device at one or more sounding radio frequencies;

receiving, from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

According to a third aspect, there is provided a computer program comprising instructions for causing an apparatus to perform at least the following:

scanning for advertising messages from radio devices within a scanning range of a connectionless mode of a second radio device at one or more advertising radio frequencies;

during the scanning, receiving one or more first advertising messages transmitted by a first radio device;

transmitting, for each of the one or more first advertising message, a first scan request requesting a transmission of a first scan response to the first radio device using the connectionless mode;

receiving, from the first radio device, one or more first scan responses using the connectionless mode;

performing bi-directional channel sounding with the first radio device at one or more sounding radio frequencies based on the one or more first scan responses;

transmitting, to the first radio device, at least one first message comprising information on one or more second channel sounding measurements performed by the second radio device at the one or more sounding radio frequencies; and receiving, from the second radio device, at least one second message comprising information on one or more first channel sounding measurements performed by the first radio device at the one or more sounding radio frequencies.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
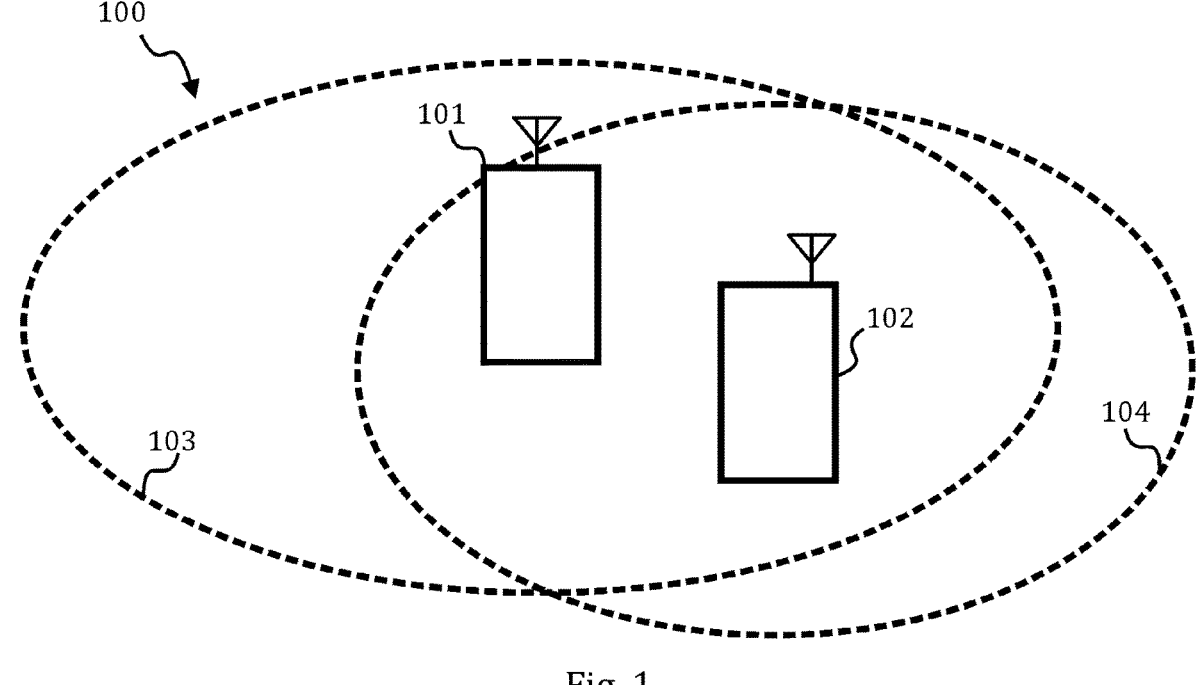
FIG. 1 illustrates a system to which some embodiments may be applied.

FIG. 1 illustrates a system 100 according to embodiments. The system 100 comprises a first radio device 101 and a second radio device 102.

The first and second radio devices 101, 102 may be any radio devices comprising a radio transceiver. Each of the first and second radio devices 101, 102 may be, for example, a portable radio device such as a cellular phone (or a smart phone), a tablet computer or a laptop computer or a wearable radio device such as a smart watch, an earpiece, earphones or smart glasses. In some embodiments, at least one of the first and second radio devices 101, 102 may be a non-portable radio device such as a (desktop) computer or a server computer. The first and second radio devices 101, 102 may be equally called, at least in some embodiments, terminal devices or user equipment.

The first and second radio devices 101, 102 may support at least one first radio communication protocol enabling transmitting of advertising messages and scanning for advertising messages transmitted by other radio devices. Said at least one first radio communication protocol may define at least one connectionless mode (equally called connectionless communication mode) for the first and second radio devices 101, 102. Connectionless communication is a data transmission method used in packet switching networks in which each data unit is individually addressed and routed based on information carried in each unit, rather than in the setup information of a prearranged, fixed data channel as in connected communication. Advertising messages are commonly used, by radio devices operating in a connectionless mode, to advertise the presence and features of a radio device. Specifically, the advertising message may be transmitted as broadcast messages. Conversely, radio devices operating in a connectionless mode may perform scanning of advertising messages for discovering other radio devices within a scanning or listening range. The scanning or listening range is illustrated in FIG. 1 for the first and second radio devices 101, 102 with the respective elements 103, 104 (not in scale relative to the first and second radio devices 101, 102). As illustrated in FIG. 1, the first and second radio device 101, 102 may be assumed to be within each other's scanning ranges 103, 104 meaning that connectionless communication between the first and second radio device 101, 102 is enabled in both directions. The results of the scanning (i.e., measured signals) may be used, e.g., for selecting a suitable radio device for communication. Such connectionless communication provides the benefit that no wireless connection or link needs to be established between the first and second radio devices 101, 102 before data transmission which expedites the transfer of data (being, specifically, channel sounding data in the following embodiments).

Said at least one first radio communication protocol for connectionless signalling may comprise, for example, Bluetooth Low Energy protocol, IEEE 802.11 based protocol and/or IEEE 802.15.4 based protocol. Correspondingly, the advertising message (or advertising protocol data unit, PDU) may comprise, for example, a Bluetooth low energy advertising frame, a WiFi beacon frame, or a broadcast message of a wireless mesh network (such as a beacon frame of a ZigBee network according to IEEE 802.15.4). As an example, a Bluetooth Low Energy advertising frame may comprise one or more of the following data fields: service universally unique identifier (UUID), local name, service data, manufacturer specific data, flags, TX (transmission) power level, slave connection interval range, service solicitation, service data, appearance, public target address, random target address, advertising interval, uniform resource identifier and/or Low Energy supported features.

The connectionless mode of said at least one first radio communication protocol for connectionless signalling may support a plurality of radio frequencies. For example, Bluetooth Low Energy defines three frequencies for transmitting and receiving advertising PDUs (i.e., three advertising channels): 2402 MHZ, 2426 MHz and 2480 MHz.

Specifically, the advertising messages as discussed in connection with embodiments may be scannable and optionally also connectable. A scannable advertising message indicates that an advertiser (i.e., here, one of the first and second radio device 101, 102) is capable of handling a scan request from an observer (i.e., here, the other one of the first and second radio devices 101, 102). Scan requests and responses are used for allowing devices to advertise more data than can fit into a single advertising message (PDU or packet). A connectable advertising message indicates that the advertiser allows a connection to be established. For example in Bluetooth Low Energy, a Connectable Scannable Undirected advertising message is denoted as ADV_IND while a Scannable Undirected advertising message is denoted as ADV_SCAN_IND. It should be appreciated that, in some other communication protocols, scan request and/or response may have different names while still providing the same functionality.

In addition to the advertising messages, the connectionless mode may enable transmitting one or more scanning message (or scanning PDUs). Scanning messages are messages which enable devices, following the initial transmission and scanning of advertising message, to broadcast more advertising data than is allowed in a single advertising PDU. Said scanning message may comprise a scan request (transmitted by the observer or scanner which received an advertising message) and scan response (transmitted by the advertiser in response to the reception of a scan request). For example in Bluetooth Low Energy, a scan request is denoted as SCAN_REQ while a scan response denoted as SCAN_RSP. It should be appreciated that, in some other communication protocols, scan request and/or response may have different names while still providing the same functionality.

The first and second radio device 101, 102 are also assumed to be capable of performing channel sounding between each other at one or more channel sounding bands such as at 2.4 GHz ISM (industrial, scientific and medical) band. The one or more channel sounding bands may coincide with one or more advertising radio frequencies supported by the first and second radio frequencies.

In multi-carrier ranging and round trip timing estimation of distance, it is common to use channel sounding to uncover the channel characteristics (or channel impulse response) as a function frequency. When round trip estimation of distance is employed, the channel sounding may be specifically bi-directional, i.e., it may involve both transmissions and measurements by both of the two radio devices involved. The channel sounding measurement information needs to be transferred between the radio devices in order to enable estimating the distance between the radio devices by either of the radio devices. Advertising messages used for discovery of radio devices (e.g., Bluetooth Low Energy advertising messages) are typically very limited in terms of the amount of information they can contain. Therefore, they are not suitable for transmitting the channel sounding measurement data acquired in ranging applications. On the other hand, establishing a Bluetooth connection (or other connection using an established wireless communication protocol) for transmitting the channel sounding measurement data may be inconvenient or inefficient in view of the goal of minimizing redundant signalling. The embodiments to be discussed below seek to overcome this limitation by transmitting the channel sounding measurement data as a part of the channel sounding procedure.

Figure 2:
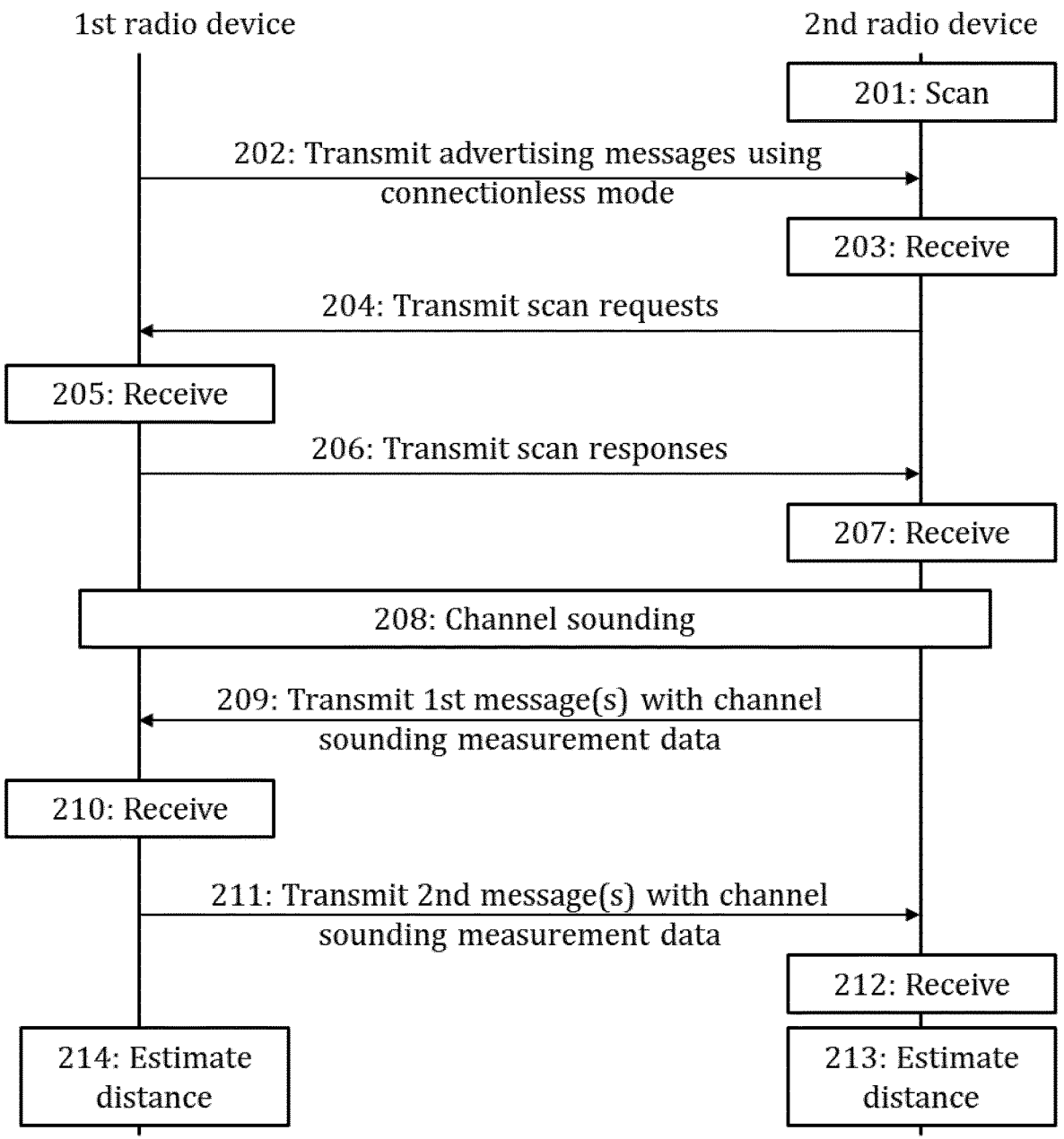
FIGS. 2 and 3 illustrate procedures according to embodiments.

FIG. 2 illustrates processes according to embodiments for performing advertising and scanning using connectionless communication and communicating measurement data between the two associated radio devices, Specifically, FIG. 2 illustrates functionalities of a first radio device, a second radio device and signalling between them. The first radio device and/or the second radio device may correspond to the first radio device 101 and/or the second radio device 102 of FIG. 1, respectively. In some embodiments, the functionalities of the first radio device and the second radio device may be carried out by a certain subunit of the first radio device and the second radio device, respectively.

The procedure is initiated by the second radio device scanning, in block 201, for advertising messages from radio devices within a scanning range of a connectionless mode of the second radio device at a plurality of advertising radio frequencies. The connectionless mode (or connectionless communication mode) and associated advertising messages may be defined as described in relation to FIG. 1. For example, the connectionless mode and the advertising messages may correspond to the ones defined in the Bluetooth Low Energy protocol. In such an embodiment, the plurality of advertising radio frequencies may correspond to the three advertising channels of the Bluetooth Low Energy mentioned above. The second radio device (and/or the first radio device) may be configured to perform scanning periodically. In some embodiments, the plurality of advertising radio frequencies may comprise at least three frequencies.

During the scanning in block 201, the first radio device causes, in message 202, wireless transmission of a plurality of first advertising messages to at least the second radio device using a connectionless mode of the first radio device. The plurality of first advertising messages may correspond, respectively, to the plurality of advertising radio frequencies supported by the connectionless mode (or at least some of them) and may be transmitted consecutively. The wireless transmission may correspond to broadcast transmission. In some embodiments, said plurality of first advertising messages may be transmitted also to one or more other radio devices (not shown in FIG. 2). In some embodiments, the first radio device may be configured to transmit advertising messages (such as the ones in message 202) periodically. The plurality of first advertising messages may comprise at least discovery and/or connection establishment information on the first radio device. Each of the plurality of the first advertising messages may comprise an identifier of the first radio device (e.g., a device address of the first radio device).

In embodiments where Bluetooth Low Energy protocol is employed, the advertising messages may correspond specifically to ADV_IND PDUs. An ADV_IND PDU is a PDU used in connectable and scannable undirected advertising events. The payload of ADV_IND PDU comprises of an advertiser address (AdvA) (corresponding here to the identifier of the first radio device) and advertiser data (AdvData) fields having respective sizes of 6 and 0-31 octets. The AdvA field contains the advertiser's (here, the first radio device's) public or random device address as indicated by TxAdd. The AdvData field, if not empty, shall contain Advertising Data from the advertiser's Host. The TxAdd is a field in the advertising physical channel PDU header. The TxAdd indicates whether the advertiser's address in the AdvA field is public (TxAdd=0) or random (TxAdd=1).

The second radio device receives, in block 203, said plurality of first advertising messages transmitted by the first radio device during said scanning. The plurality of first advertising messages may be received at first reception time instances as measured by the first radio device (according to its local reference clock).

In other embodiments, at least one of the plurality of first advertising messages may be received in block 203 (as opposed to all of them). The following discussion applies, mutatis mutandis, also for this case.

In response to the receiving of each of (or at least one of) the plurality of first advertising messages in block 203, the second radio device transmits, in message 204, a first scan request requesting a transmission of a first scan response to the first radio device. In other words, a plurality of first scan requests corresponding, respectively, to the plurality of first advertising messages may be transmitted in message 204. Each first scan request (or at least some of them) may comprise at least an identifier of the second radio device. Said identifier of the second radio device may correspond to a device address of the second radio device. Each first scan request (or at least some of them) may further comprise the identifier of the first radio device (e.g., a device address of the first radio device) for indicating the intended recipient of the scan request. Transmission of the first scan requests (message 204) may be performed using a connectionless mode of the second radio device. Each first scan request in message 204 may be transmitted using the same (carrier) frequency (i.e., the same advertising channel) as used by the received advertising message which triggered the transmission of that particular scan request.

In embodiments where Bluetooth Low Energy protocol is employed, the first scan requests may correspond to SCAN_REQ PDUs. The payload of a SCAN_REQ PDU comprises ScanA and AdvA fields, each having the size of 6 octets. The ScanA field contains the scanner's (here, the second radio device's) public or random device address as indicated by TxAdd. The AdvA field is the address of the device (here, the first radio device) to which this PDU is addressed (as received in message 302). The AdvA field contains the advertiser's (here, the first radio device's) public or random device address as indicated by RxAdd. The TxAdd in the advertising physical channel PDU header indicates whether the scanner's address in the ScanA field is public (TxAdd=0) or random (TxAdd=1). The RxAdd in the advertising physical channel PDU header indicates whether the advertiser's address in the AdvA field is public (RxAdd=0) or random (RxAdd=1).

The first radio device receives, in block 205, a plurality of first scan requests from the second radio device. The plurality of first scan requests may be received at second reception time instances as measured by the first radio device (according to its local reference clock).

In response to the receiving of each of (or at least one of) the plurality of first scan requests in block 205, the first radio device transmits, in message 206, a first scan response to the second radio device using the connectionless mode. In other words, the first radio device transmits, in message 206, a plurality of first scan responses corresponding, respectively, to the plurality of first scan requests (each of which is associated with a particular radio frequency of the plurality of advertising radio frequencies) to the second radio device. Each first scan response (or at least some of them) may comprise the identifier of the first radio device. Each first scan response in message 206 may be transmitted using the same (carrier) frequency (i.e., the same advertising channel) as used by the associated first advertising message and associated first scan request.

In some embodiments, the transmission of each first scan response, in message 206, by the first radio device, may be performed only in response to detecting, by the first radio device, that the associated first scan request comprises the identifier of the first radio device.

In embodiments where Bluetooth Low Energy protocol is employed, the first scan responses may correspond to SCAN_RSP PDUs. The payload of a SCAN_RSP PDU comprises AdvA and ScanRspData fields having respective sizes of 6 and 0-31 octets. The AdvA field contains the advertiser's (here, the first radio device's) public or random device address as indicated by TxAdd. The Scan RspData field may contain any data from the advertiser's Host.

The second radio device receives, in block 207, the plurality of first scan responses using the connectionless mode. The plurality of first scan responses may be received at third reception time instances as measured by the second radio device (according to its local reference clock).

Following the three-way handshake procedure discussed in connection with elements 201 to 207, both the first and second radio devices have enough information to determine the identity of the other radio device (i.e., the identity of the peer) and are aware of its willingness to communicate. Next, the first and second radio devices perform, in block 208, channel sounding between them at a plurality of sounding radio frequencies. The plurality of sounding radio frequencies may be comprised, e.g., within the 2.4 GHz ISM band. As an example, the plurality of sounding radio frequencies may consist of 80 frequencies. The channel sounding at the plurality of sounding radio frequencies may form a part of multi-carrier phase ranging scheme (sounding signals acting as phase ranging signals). The channel sounding may be carried out, by each of the first and second radio devices, using a proprietary communication mode, i.e., not using the connectionless mode (e.g., Bluetooth Low Energy connectionless mode) of the first/second radio device or any established connected mode (e.g., Bluetooth Classic or Bluetooth Low Energy connected mode) of the first/second radio device.

The channel sounding in block 208 may comprise, in addition to the channel sounding measurements, a synchronization stage preceding the channel sounding measurements, as will be discussed in connection with FIG. 3.

The first radio device may perform the channel sounding specifically based on the received plurality of first scan responses which enable identification of the second radio device and of its willingness to communicate with the first radio device. From the point of view of the first radio device, the channel sounding procedure may be initiated or triggered following the transmission of the plurality of first scan responses in block 206.

The second radio device may perform the channel sounding specifically based on the received plurality of first advertising messages and the plurality of first scan requests which together enable identification of the first radio device and of its willingness to communicate with the second radio device. In other words, from the point of view of the second radio device, the channel sounding procedure may be initiated or triggered by the reception of the first plurality of scan requests (or at least some of them) in block 207.

The performing of the channel sounding in block 208 may comprise at least transmitting, by the first radio device, a plurality of first sounding signals at the plurality of (respective) sounding radio frequencies to the second radio device and correspondingly measuring, by the second radio device, the plurality of first sounding signals. Moreover, the performing of the channel sounding may comprise transmitting, by the second radio device, a plurality of second sounding signals at the plurality of (respective) sounding radio frequencies to the first radio device and correspondingly measuring, by the first radio device, the plurality of second sounding signals. In other words, the channel sounding in block 208 may be specifically bi-directional or two-way channel sounding. The measuring of the first/second sounding reference signal may comprise measuring amplitude and/or phase of the first/second sounding reference signal. In some embodiments, the measuring of the first/second sounding reference signal may comprise measuring in-phase and quadrature (IQ) components of the first/second sounding reference signal (which contain the phase and frequency information of the first/second sounding reference signal).

Following the channel sounding in block 208, the second radio device transmits, in message 209, to the first radio device, at least one first message. The at least one first message may comprise one or more packets. The at least one first message comprises information on a plurality of first channel sounding measurements performed by the second radio device (i.e., measurements of the plurality of first sounding signals having the plurality of sounding radio frequencies). The information on the plurality of first channel sounding measurements may comprise ranging data (i.e., information associated with or needed for ranging such as with multi-carrier phase ranging). Said ranging data may comprise, for example, amplitude information and/or phase information of the measured plurality of second sounding signals. In some embodiments, said ranging data may comprise specifically IQ data. Said ranging data may comprise, e.g., 64 bits per sounding radio frequency. In an embodiment where the number of the sounding radio frequencies is 80, 640 bytes of information is transmitted in the at least one first message. In some embodiments, the information on the plurality of first channel sounding measurements may comprise full channel characteristics defined, e.g., via a channel impulse response and calculated based on the plurality of first channel sounding measurements at the plurality of sounding radio frequencies. The first radio device receives, in block 208, the at least one first message from the second radio device.

Correspondingly, the first radio device transmits, in message 211, to the second radio device, at least one second message which comprises information on a plurality of second channel sounding measurements performed by the first radio device (i.e., measurements of the plurality of second sounding signals). The at least one second message may comprise one or more packets. The information on the plurality of second channel sounding measurements may be defined, mutatis mutandis, as described for the information on the plurality of first channel sounding measurements. The second radio device receives, in block 212, the second response message from the second radio device using the connectionless mode of the second radio device.

In some embodiments, the order of messages 209, 211 (and correspondingly the order of blocks 210, 212) may be reversed.

Based on the information on the first and second channel sounding measurements, one or both of the first and second radio devices may estimate, in blocks 213, 214, a distance between the first and second radio devices. The estimation of the distance may be based, e.g., on multi-carrier phase ranging (assuming that at least the phase is measured in the channel sounding measurements). The multi-carrier phase ranging may comprise transmission of phase ranging signals (here, corresponding to the sounding signals) at multiple carrier frequencies, computing multiple phase ranging values (i.e., phase difference values) on the basis of the phase ranging signals and using the multiple phase ranging values to determine the distance between the first and second radio devices. The multi-carrier phase ranging may be performed specifically for a round trip, i.e., transmission of a phase ranging signal of a given carrier frequency from the first radio device to the second radio device and retransmission, by the second radio device, of the same phase ranging signal back to the first radio device. Multi-carrier phase ranging systems eliminate the ambiguity intrinsic in phase measurements. While in principle two signals having different frequencies are sufficient for removing said phase ambiguity, in practice more than two signals having different frequencies may be employed for improving accuracy.

In some embodiments, the ranging functionalities described in the previous paragraph may be carried out in a (computing) device other than the first or second radio device. In such embodiments, the first and second radio device may be configured to output or transmit the information on the first and second channel sounding measurements to said (computing) device via a wireless communications network or link or via a wired communication link.

Additionally or alternatively, the information on the first and second channel sounding measurements may be used for a purpose other than ranging. The information on the first and second channel sounding measurements may enable evaluating the channel characteristics of the propagation channel between the first and second radio device such as channel quality. This information may be used, e.g., for adjusting the transmit power of the first and/or second radio device.

It should be noted that the first radio device may be configured to perform not only the functionalities described for the first radio device in connection with FIG. 2 but also the functionalities described for the second radio device in connection with FIG. 2. The same applies, mutatis mutandis, for the second radio device. In other words, each of the first and second radio device may be configured to act as a scanner and an advertiser at different times. For example, following the procedure of FIG. 2, the first radio device may at a certain time thereafter initiate scanning in connectionless mode and receive from the second radio device or a third radio device within its scanning range an advertising message and the process of FIG. 2 may be repeated with the first radio device acting as "the second radio device" and the third device acting as "the first radio device".

Figure 3:
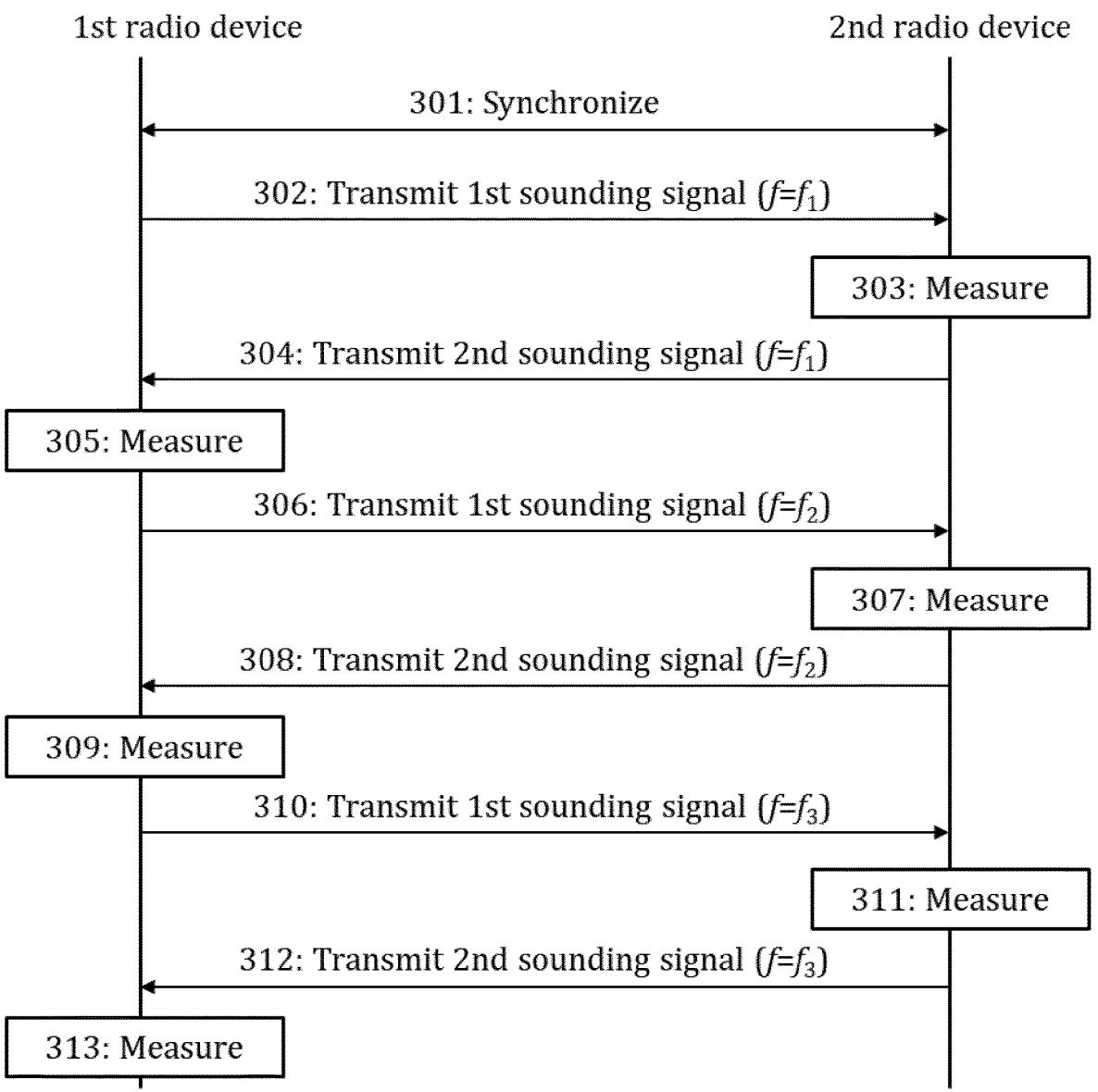

FIG. 3 illustrates in more detail the channel sounding procedure according to embodiments. Specifically, the procedure of FIG. 3 may correspond to a more detailed view of block 208 of FIG. 2. Thus, similar to FIG. 2, FIG. 3 illustrates functionalities of a first radio device, a second radio device and signalling between them. The first radio device and/or the second radio device may correspond to the first radio device 101 and/or the second radio device 102 of FIG. 1, respectively. In some embodiments, the functionalities of the first radio device and the second radio device may be carried out by a certain subunit of the first radio device and the second radio device, respectively.

Referring to FIG. 3, before transmitting any channel sounding signals, the first and second radio devices synchronize, in messages 301, with each other. Specifically, the synchronization in messages 305 (or a single message) may comprise synchronizing local reference clocks of the first and second radio devices with each other. The synchronizing may comprise synchronizing said local reference clocks to a common clock reference (e.g., a clock reference provided by one of the first and second radio devices or an external clock reference provided, e.g., by an access node of a radio access network or some other external device). Any conventional synchronization method for wireless communication may be used here.

For synchronization, it may be considered sufficient to achieve relative synchronization. For example, frequencies of the local reference clocks of the first and second radio devices may be allowed to be within a few kHz from each other. Also for the timing reference, or the reference clock in the system, it may be considered sufficient to know the relative timing error between first and second radio devices. Said timing reference may be measured during the synchronization in message 301 by assuming that the signal transmitted by the first radio device is directly correlated to the local reference clock of the first radio device.

The synchronization, in messages 301, may comprise transmitting at least one synchronization signal from the first radio device to the second radio device and/or from the second radio device to the first radio device. In some embodiments, the first radio device may transmit, for synchronizing the first and second radio devices in messages 301, at least a message comprising at least a preamble and an access address to the second radio device. Alternatively or additionally, the second radio device may transmit, for synchronizing the first and second radio devices in messages 301, at least a message comprising at least a preamble and an access address to the first radio device. In the example of FIG. 3, it is assumed that the plurality of sounding radio frequencies used for the channel sounding comprise three radio frequencies ($f_1$, $f_2$ and $f_3$). In practice, the number of the plurality of sounding radio frequencies may be significantly larger than three (e.g., at least ten or at least twenty). The general principle illustrated with three sounding radio frequencies in FIG. 3 applies equally for any other number of sounding radio frequencies (i.e., for one or more sounding radio frequencies).

The channel sounding measurements are described in elements 302 to 307. First, the first radio device transmits, in message 302, a first sounding signal having a first (carrier) frequency $f_1$ to the second radio device. The transmission in message 302 may occur at a first pre-defined transmission time instance (as measured according to a local reference clock of the first radio device). The second radio device measures, in block 303, said first sounding signal. The measuring in block 303 may occur at a first pre-defined reception time instance (as measured according to a local reference clock of the second radio device synchronized with the local reference clock of the first radio device). As described above, the measuring of a given sounding signal (such as the first sounding signal) may comprise at least measuring amplitude, phase and/or IQ components of the given sounding signal. The first pre-defined reception time instance is synchronized with the second pre-defined transmission time instance, i.e., they may (substantially) coincide. Upon measuring in block 303, the second radio device, transmits, in message 304, a second sounding signal having the first radio frequency $f_1$ back to the first radio device (at a second pre-defined transmission time instance). The second sounding signal having the first radio frequency $f_1$ may correspond, partly or fully, to the first sounding signal having the first radio frequency $f_1$. The first radio device measures, in block 305, the second sounding signal (at a second pre-defined reception time instance).

Once the channel sounding measurements for the first radio frequency $f_1$ have been concluded, the procedure discussed in connection with elements 302 to 305 for the first radio frequency $f_1$ is repeated for the second and third radio frequencies $f_2$ and $f_3$ in elements 306 to 309 and elements 310 to 313, respectively. The above discussion applies, mutatis mutandis, for these procedures.

While embodiments discussed in connection with FIGS. 2 and 3 corresponded to scenarios where a plurality of advertising radio frequencies and a plurality of sounding radio frequencies are used, respectively, for advertising and scanning and for channel sounding, in other more general embodiments, one or more advertising radio frequencies and/or one or more sounding radio frequencies may be employed instead. Correspondingly, the plurality of first channel sounding measurements and/or the plurality of second channel sounding measurements (at the plurality of sounding radio frequencies) as discussed in connection with above embodiments may, in such more general embodiments, be replaced, respectively, with one or more first channel sounding measurements and/or one or more second channel sounding measurements.

The blocks, related functions, and information exchanges described above by means of FIGS. 2 and 3 are in no absolute chronological order, and some of them may be performed simultaneously or in an order differing from the given one. In some embodiments, some of the steps may be neglected, for example, if the relevant information (e.g., a configuration) is already available (e.g., stored to a memory).

Figure 4:
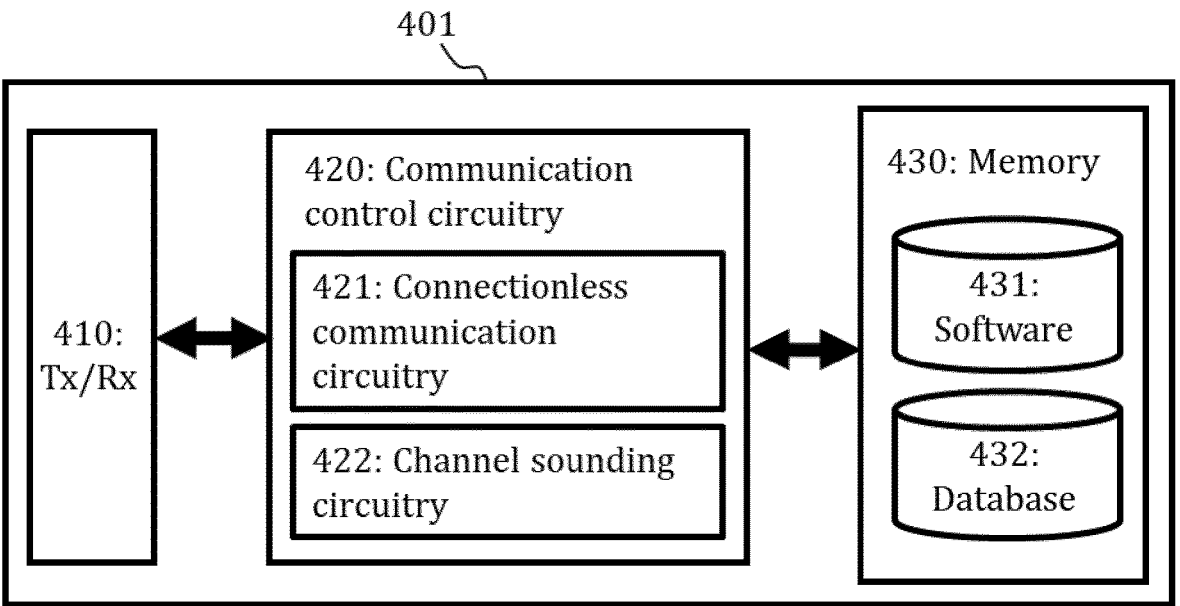
FIG. 4 illustrates an apparatus according to an embodiment.

FIG. 4 illustrates an apparatus 401 configured to carry out the functions described above in connection with a first and/or second radio device such as the first and/or second radio device 101, 102 of FIG. 1 and/or the first and/or second radio device shown in any of FIGS. 2 and 3. The apparatus may be an electronic device comprising electronic circuitries. The apparatus may be a separate network entity or a plurality of separate entities. The apparatus may comprise a communication control circuitry 420, such as at least one processor, and at least one memory 430 including a computer program code (software) 431 wherein the at least one memory and the computer program code (software) are configured, with the at least one processor, to cause the apparatus to carry out any one of the embodiments of the first radio device and/or second radio device described above.

The memory 430 may comprise a database 432 which may maintain, for example, advertising discovery information (e.g., identifiers of the first and/or second radio devices) and/or information on sounding signal measurements performed by the apparatus or some other apparatus (radio device) based on sounding signal transmitted by the apparatus, as described in previous embodiments. The memory 430 may also comprise other databases which may not be related to the described functionalities according to embodiments.

The memory 430 of the apparatus 410 may be implemented using any suitable data storage technology, such as semiconductor based memory devices, flash memory, magnetic memory devices and systems, optical memory devices and systems, fixed memory and removable memory.

Referring to FIG. 4, the communication control circuitry 420 may comprise connectionless communication circuitry 421 and channel sounding circuitry 422. The connectionless communication circuitry 421 may be configured, for example, to carry out at least some of actions pertaining to any of elements 201 to 207 of FIG. 2. The channel sounding circuitry 422 may be configured, for example, to carry out at least some of actions pertaining to any of elements 208 to 214 of FIG. 2 and/or any of elements illustrated in FIG. 3.

The apparatus 401 may further comprise communication interfaces (Tx/Rx) 410 comprising hardware and/or software for realizing communication connectivity according to one or more communication protocols such as at least one communication protocol enabling connectionless communication using a connectionless mode. The communication interface may provide the apparatus with communication capabilities to communicate in the cellular communication system and enable communication, for example, with network nodes and terminal devices (or radio devices). The communication interface 410 may comprise standard well-known components such as an amplifier, filter, frequency-converter, (de) modulator, and encoder/decoder circuitries and one or more antennas. The communication interface 410 may comprise radio interface components providing the apparatus with radio communication capability in the cell.

As used in this application, the term "circuitry may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2 and 3 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 and 3 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may, additionally or alternatively, be carried out in the form of a computer process defined by a computer program or portions thereof. Embodiments of the methods described in connection with FIGS. 2 and 3 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways,

The invention claimed is:

1. A first radio device comprising:
   at least one processor; and
   at least one memory including a computer program code, wherein the at least one memory and the computer program code are configured, with the at least one processor, to cause the first radio device to perform:
   causing wireless transmission of one or more first advertising messages at one or more advertising radio frequencies using a Bluetooth Low Energy connectionless mode of the first radio device;

receiving, using the Bluetooth Low Energy connectionless mode, for at least one of the one or more first advertising messages, a first SCAN_REQ protocol data unit, PDU, requesting a transmission of a first scan response from a second radio device, wherein the second radio device is a device which received said at least one of the one or more first advertising message;

transmitting, for each of one or more first SCAN_REQ PDUs, a first SCAN_RSP PDU to the second radio device using the Bluetooth Low Energy connectionless mode;

performing, based on one or more received first SCAN_REQ PDUs, bi-directional channel sounding with the second radio device at one or more sounding radio frequencies;

receiving, from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

2. The first radio device according to claim 1, wherein the performing of the channel sounding comprises:

causing synchronizing, before performing any channel sounding measurements, the first radio device with the second radio device.

3. The first radio device according to claim 1, wherein the performing of the channel sounding comprises performing for each radio frequency of the one or more sounding radio frequencies:

transmitting, to the second radio device, at least one first sounding signal at a radio frequency of the one or more sounding radio frequencies; and measuring at least one second sounding signal transmitted by the second radio device at said radio frequency of the one or more sounding radio frequencies.

4. The first radio device according to claim 1, wherein the one or more sounding radio frequencies comprise a plurality of sounding radio frequencies, the one or more first channel sounding measurements comprise a plurality of first channel sounding measurement and the one or more second channel sounding measurements comprise a plurality of second channel sounding measurements and the means are further configured to perform:

estimating a distance between the first and second radio devices based on the information on the plurality of first channel sounding measurements and the plurality of second channel sounding measurements, wherein the information on the plurality of first and second channel sounding measurements comprises at least information on phase measurements at the plurality of sounding radio frequencies and the estimating of the distance is performed using a multi-carrier phase ranging method with round trip timing estimation.

5. The first radio device according to claim 1, wherein the at least one memory and the computer program code are configured to, with the at least one processor, cause the first radio device perform:

scanning for advertising messages from radio devices within a scanning range of the Bluetooth Low Energy connectionless mode at one or more advertising radio frequencies;

during the scanning, receiving one or more second advertising messages transmitted by a third radio device;

transmitting, for each of the one or more second advertising message, a second SCAN_REQ PDU requesting a transmission of a second SCAN_RSP PDU to the third radio device using the Bluetooth Low Energy connectionless mode;

receiving, from the third radio device, one or more second SCAN_RSP PDUs using the Bluetooth Low Energy connectionless mode;

performing bi-directional channel sounding with the third radio device at one or more sounding radio frequencies based on the one or more second SCAN_RSP PDUs;

transmitting, to the third radio device, a third message comprising information on one or more fourth channel sounding measurements performed by the first radio device based on sounding signals received from the third radio device at the one or more sounding radio frequencies; and receiving, from the third radio device, a fourth message comprising information on one or more third channel sounding measurements performed by the third radio device at the one or more sounding radio frequencies.

6. A second radio device comprising:

at least one processor; and at least one memory including a computer program code, wherein the at least one memory and the computer program code are configured, with the at least one processor, to cause the second radio device to perform:

scanning for advertising messages from radio devices within a scanning range of a Bluetooth Low Energy connectionless mode of the second radio device at one or more advertising radio frequencies;

during the scanning, receiving one or more first advertising messages transmitted by a first radio device;

transmitting, for each of the one or more first advertising message, a first SCAN_REQ PDU requesting a transmission of a first SCAN_RSP PDU to the first radio device using the Bluetooth Low Energy connectionless mode;

receiving, from the first radio device, one or more first SCAN_RSP PDUs using the Bluetooth Low Energy connectionless mode;

performing bi-directional channel sounding with the first radio device at the one or more sounding radio frequencies based on the one or more first SCAN_RSP PDUs;

transmitting, to the first radio device, at least one first message comprising information on one or more second channel sounding measurements performed by the second radio device at the one or more sounding radio frequencies; and receiving, from the first radio device, at least one second message comprising information on one or more first channel sounding measurements performed by the first radio device at the one or more sounding radio frequencies.

7. The second radio device according to claim 6, wherein the performing of the channel sounding comprises:

causing synchronizing, before performing any channel sounding measurements, the second radio device with the first radio device.

8. The second radio device according to claim 6, wherein the performing of the channel sounding comprises performing for each radio frequency of the one or more sounding radio frequencies in sequence:

measuring at least one first sounding signal transmitted by the first radio device at a radio frequency of the one or more sounding radio frequencies; and transmitting, to the first radio device, at least one first sounding signal at said radio frequency.

9. The second radio device according to claim 6, wherein the one or more sounding radio frequencies comprise a plurality of sounding radio frequencies, the one or more first channel sounding measurements comprise a plurality of first channel sounding measurement and the one or more second channel sounding measurements comprise a plurality of second channel sounding measurements, and the at least one memory and the computer program code are configured to, with the at least one processor, cause the second radio device further to perform:

estimating a distance between the first and second radio devices based on estimated round trip times based on the information on the plurality of first and second channel sounding measurements, wherein the information on the plurality of first and second channel sounding measurements comprises at least information on phase measurements at the plurality of sounding radio frequencies and the estimating of the distance is performed using a multi-carrier phase ranging method with round trip timing estimation.

10. A method comprising:

causing wireless transmission of one or more first advertising messages at one or more advertising radio frequencies using a Bluetooth Low Energy connectionless mode of a first radio device;

receiving, using the Bluetooth Low Energy connectionless mode, for at least one of the one or more first advertising messages, a first SCAN_REQ PDU requesting a transmission of a first SCAN_RSP PDU from a second radio device, wherein the second radio device is a device which received said at least one of the one or more first advertising message transmitting, for each of one or more first SCAN_REQ PDUs, a first SCAN_RSP PDU to the second radio device using the Bluetooth Low Energy connectionless mode;

performing, based on one or more received first SCAN_REQ PDUs, bi-directional channel sounding with the second radio device at one or more sounding radio frequencies;

receiving, from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

11. A method comprising:

scanning for advertising messages from radio devices within a scanning range of a Bluetooth Low Energy connectionless mode of a second radio device at one or more advertising radio frequencies;

during the scanning, receiving one or more first advertising messages transmitted by a first radio device;

transmitting, for each of the one or more first advertising message, a first SCAN_REQ PDU requesting a transmission of a first SCAN_RSP PDU to the first radio device using the Bluetooth Low Energy connectionless mode;

receiving, from the first radio device, one or more first SCAN_RSP PDUs using the Bluetooth Low Energy connectionless mode;

performing bi-directional channel sounding with the first radio device at one or more sounding radio frequencies based on the one or more first SCAN_RSP PDUs;

transmitting, to the first radio device, at least one first message comprising information on one or more second channel sounding measurements performed by the second radio device at the one or more sounding radio frequencies; and receiving, from the first radio device, at least one second message comprising information on one or more first channel sounding measurements performed by the first radio device at the one or more sounding radio frequencies.

12. A non-transitory computer readable medium having stored thereon instructions that, when executed by a computer, cause the computer to perform at least the following:

causing wireless transmission of one or more first advertising messages at one or more advertising radio frequencies using a Bluetooth Low Energy connectionless mode of a first radio device;

receiving, using the Bluetooth Low Energy connectionless mode, for at least one of the one or more first advertising messages, a first SCAN_REQ PDU requesting a transmission of a first SCAN_RSP PDU from a second radio device, wherein the second radio device is a device which received said at least one of the one or more first advertising message;

transmitting, for each of one or more first SCAN_REQ PDUs, a first SCAN_RSP PDU to the second radio device using the Bluetooth Low Energy connectionless mode;

performing, based on one or more received first SCAN_REQ PDUs, bi-directional channel sounding with the second radio device at one or more sounding radio frequencies;

receiving, from the second radio device, at least one first message comprising information on one or more second channel sounding measurements performed by the second radio device at the one or more sounding radio frequencies; and transmitting, to the second radio device, at least one second message comprising information on one or more first channel sounding measurements performed by the first radio device at the one or more sounding radio frequencies.

13. A non-transitory computer readable medium having stored thereon instructions that, when executed by a computer, cause the computer to perform at least the following:

scanning for advertising messages from radio devices within a scanning range of a Bluetooth Low Energy connectionless mode of a second radio device at one or more advertising radio frequencies;

during the scanning, receiving one or more first advertising messages transmitted by a first radio device;

transmitting, for each of the one or more first advertising message, a first SCAN_REQ PDU requesting a transmission of a first SCAN_RSP PDU to the first radio device using the Bluetooth Low Energy connectionless mode;

receiving, from the first radio device, one or more first SCAN_RSP PDUs using the Bluetooth Low Energy connectionless mode;

performing bi-directional channel sounding with the first radio device at one or more sounding radio frequencies based on the one or more first SCAN_RSP PDUs;

transmitting, to the first radio device, at least one first message comprising information on one or more second channel sounding measurements performed by the second radio device at the one or more sounding radio frequencies; and receiving, from the first radio device, at least one second message comprising information on one or more first channel sounding measurements performed by the first radio device at the one or more sounding radio frequencies.

\* \* \* \* \*